US008159687B2

(12) United States Patent
Morales et al.

(10) Patent No.: US 8,159,687 B2
(45) Date of Patent: Apr. 17, 2012

(54) METHOD AND SYSTEM FOR PAGE EXCEPTION PROGRAMMING UTILIZING METADATA

(75) Inventors: Javier A. Morales, Irondequoit, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1384 days.

(21) Appl. No.: 11/800,368

(22) Filed: May 3, 2007

(65) Prior Publication Data

US 2008/0276251 A1 Nov. 6, 2008

(51) Int. Cl.
*G06F 15/00* (2006.01)
(52) U.S. Cl. ........................................ 358/1.13; 358/1.9
(58) Field of Classification Search .................. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 5,710,874 | A | 1/1998 | Bergen ........................... 395/115 |
| 7,089,248 | B1 | 8/2006 | King et al. ....................... 707/10 |
| 7,162,466 | B2 | 1/2007 | Kaasten et al. .................... 707/1 |
| 7,188,316 | B2 | 3/2007 | Gusmorino et al. ........... 715/764 |
| 7,191,394 | B1 | 3/2007 | Ardeleanu et al. ............. 715/513 |
| 2002/0027673 | A1* | 3/2002 | Roosen et al. ................ 358/1.13 |
| 2006/0126114 | A1* | 6/2006 | Choi et al. .................... 358/1.15 |

OTHER PUBLICATIONS

Arts PDF Split and Merge, Adobe Acrobat plug-in; www.artspdf.com.

* cited by examiner

*Primary Examiner* — Thierry Pham
(74) *Attorney, Agent, or Firm* — Kermit D. Lopez; Luis M. Ortiz; Kevin Soules

(57) ABSTRACT

A method and system for automatically generating page exception programming based on user-defined rules is disclosed. A page specific metadata in a PDL file can be evaluated against specific rules to automatically create page exception programming. An embedded PDL device control instructions can also be evaluated and converted into page exception programming thereby producing an integrating representation of all page exception programming for a print job. The PDL page extracted as an exception page can then be displayed on a graphical user interface which provides an operator to confirm pages for editing.

19 Claims, 4 Drawing Sheets

METHOD AND SYSTEM FOR PAGE EXCEPTION PROGRAMMING UTILIZING METADATA

TECHNICAL FIELD

Embodiments are generally related to data-processing methods and systems. Embodiments are also related to rendering devices and document management systems. Embodiments are additionally related to methods and systems for automatically generating page exception programming utilizing metadata.

BACKGROUND OF THE INVENTION

Reproduction machines such as copiers and printers have become more complex and versatile with respect to the jobs they perform. The user interface between the machine and the operator or user, which in essence permits the dialogue between the operator and the machine, must necessarily be expanded if full and efficient utilization of the machine is to be realized. A suitable interface must not only provide the controls, displays, and messages necessary to activate, program, monitor, and maintain the machine, but must be able to accurately and efficiently program machine instructions for a complex reproduction run. Such reproduction runs generally include a set of documents with most of the documents requiring common features. However, often several documents of the set require special features or exceptions to the common features of most of the documents of the set. This requires operator attention and selection to program the exceptions for each such document requiring an exception.

Exception page programming is a process for expressing and recording the instructions for deviating from the baseline or common job programming for the print job. Typically, exception page programming is accomplished by a user reviewing the job pages and indicating the exception programming for specified pages. This process is labor intensive and prone to error because there is difficulty in unambiguously specifying the pages when page numbers shift as a result of insert sheets, chapter starts or simplex/duplex changes.

One prior art approach that offers a primitive implementation of automated exception page programming for host based composition systems involves the use of each section of a document as a separate PDF file with recognizable file name suffixes for inserts. These files are concatenated under control of a script that performs special actions when a file with an "insert" file name suffix is encountered. This approach results in the coupling of the document creation process to the automated exception page programming, which is undesirable because it is not flexible.

A difficulty with such prior art systems is that often the same exceptions apply to several documents. It is then necessary for the operator to painstakingly select the exceptions (i.e., there may be several such as chapter start, special paper or insert, copy quality or image shift) for each document, repeating the same exceptions until the process has been completed for each document. Each time the operator is called upon to make a selection, the possibility of an error in the selection process is increased. Errors in selection can result not only in an inaccurate work product which will need to be at least partially redone, but also can result in conflicting exceptions or requirements which may render the job impossible to initiate. The selections must then be reviewed and rechecked to uncover the source of conflict. This can be a very time consuming and inefficient process.

Based on the foregoing it is believed that a need exists for an improved system and method for automatically generating page exception programming based on user defined rules utilizing metadata.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing method and system.

It is another aspect of the present invention to provide for improved document management methods and systems.

It is a further aspect of the present invention to provide for an improved method and system for automatically generating page exception programming utilizing metadata.

The aforementioned aspects and other objectives and advantages can now be achieved as described herein. A method and system for automatically generating page exception programming based on user-defined rules is disclosed. Page specific metadata in a PDL (Page Description Language) file can be evaluated against specific page exception rules to automatically create page exception programming. Embedded PDL device control instructions can also be evaluated and converted into page exception programming, thereby producing an integrated representation of all page exception programming for a print job. The PDL page extracted as an exception page can then be displayed on a GUI (Graphical User Interface) that permits an operator to confirm pages for editing.

In accordance with one embodiment, an input window for exception page programming can be provided. One or more page exception rules can be generated for recognizing exception programming triggers and associated programming. The metadata associated with the pages and the page content can thereafter be extracted. Next, the page exception rules can be applied to the information obtained from the metadata and the page content. The page exception programming can be automatically generated based on the page exception rules.

The page exception rules can be associated with a specific input method so that the system can receive jobs, and inspect and evaluate such jobs against the defined page exception rules in order generate page exception programming that can be utilized by an associated RIP (Raster Image Processor) and rendering device. The auto generated page exception programming can be combined with any embedded PDL device control instructions. The integrated list of exception page programming is preferably utilized when reviewing the job programming or any displays that include job programming effects.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional image processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 3-4 can, for example, be implemented in the context of such a software module.

Figure 1:
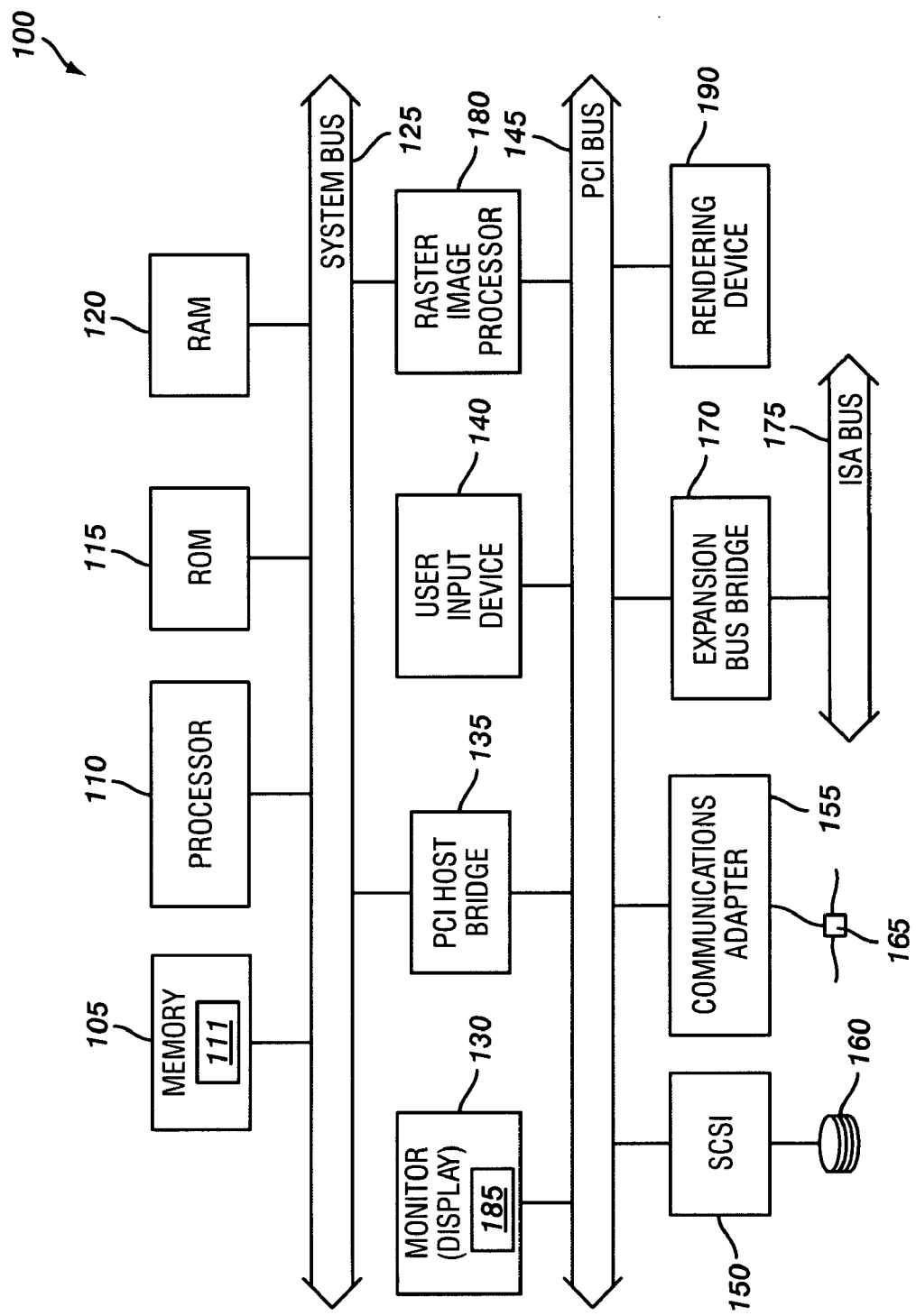
FIG. 1 illustrates a block diagram of a data-processing apparatus, which can be utilized for page exception programming, in accordance with a preferred embodiment.

Referring to the drawings and in particular to FIG. 1, there is depicted a data-processing apparatus 100 which can be utilized for automatically programming page exception in accordance with a preferred embodiment. Page exception programming refers to alternate processing applied to a subset of the pages in a PDL. This can be achieved via several mechanisms including the modification of job programming or making changes to the Page Description Language file content that will affect the rendered output. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As depicted in FIG. 1, a memory 105, a processor (CPU) 110, a Read-Only memory (ROM) 115, and a Random-Access Memory (RAM) 120 are generally connected to a system bus 125 of data-processing apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 100 thus includes CPU 110, ROM 115, RAM 120, and a rendering device 190 (e.g., printer, copier, scanner, etc.), which are also coupled to a PCI (Peripheral Component Interconnect) local bus 145 of data-processing apparatus 100 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, a small computer system interface (SCSI) 150, a raster image processor (RIP) 180, and an expansion bus-bridge 170 are also attached to PCI local bus 145. The communications adapter 155 can be utilized for connecting data-processing apparatus 100 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

The user interface 185 allows for the modification of certain characteristics of a printed image, such as, for example, lightness/darkness, contrast, highlights, shadows, and color cast. In this regard, a user actuates the appropriate keys on the user interface 185 to adjust the parameters of a print job. The rendering device 190 may also require the use of DFE (Digital Front End) data, which can be supplied by an RIP (Raster Image Processor) 180, in order to assemble the complete picture, separate the images into the appropriate colors, and send the information to the rendering device 190. The print driver (not shown) is accessible to a user via a graphical user interface (GUI) 185.

The graphical user interface 185 provides an interface that enables a user to select and communicate job programming attributes to the data-processing system 100. Job programming attributes describe selected parameters by which a print job may be processed and may include parameters for page layout (e.g., size, orientation, duplex), color options (e.g., brightness, contrast, saturation), media type, finishing options (e.g., output tray, collate, staple, binding), and the like. In addition to selecting parameters for the print job, the graphical user interface 185 and the print driver may be utilized to set additional or alternate job attributes on a per-page basis for selected pages. These special attributes to be used for selected pages within a job are often referred to as page exceptions. Similarly, the ability to set different attributes on a per-page basis is sometimes referred to as page-exception programming.

Figure 2:
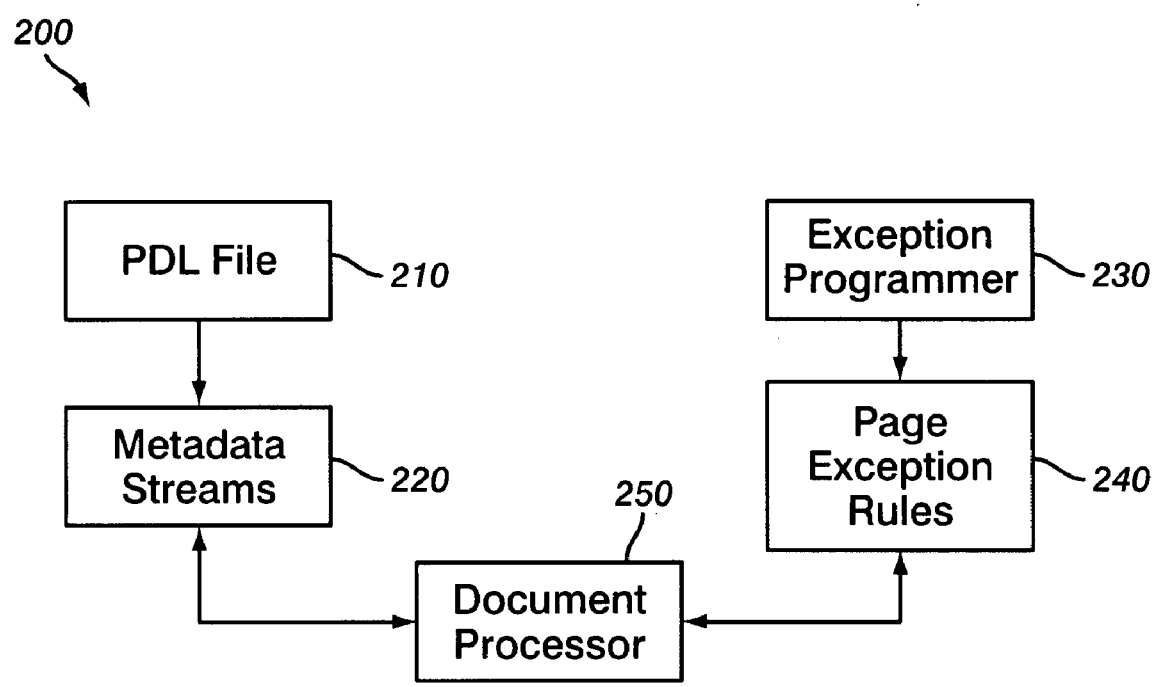
FIG. 2 illustrates a block diagram of a system for page exception programming, which can be implemented in accordance with a preferred embodiment.

Referring to FIG. 2 a block diagram of a system 200 for page exception programming is illustrated, which can be implemented in accordance with a preferred embodiment. The system 200 can be implemented by a module such as module 111 depicted in FIG. 1 or may utilize one or more such software modules in association with a data-processing apparatus, such as, for example, the data-processing apparatus 100 depicted in FIG. 1. Each block such as blocks 210, 220 and so forth can represent a module such as module 111 depicted in FIG. 1 or a process step. System 200 can include, for example, a PDL file as indicated at block 210. The metadata streams as indicated at block 220 can be extracted from the PDL file. The exception programmer 230 can configure the system prior to sending jobs to the rendering device 190. The exception programmer 230 can also use a job programming tool on one or more jobs to "teach" the system the rules for recognizing exception programming triggers and the associated programming.

The exception programmer 230 can create page exception rules as indicated at block 240 as required in order to leverage various forms of metadata available in the input PDL. These rules can then be saved as a collection that can be associated with a specific input mechanism, e.g. virtual printer, queue, or hot folder. Furthermore, these rule collections can contain disparate evaluation criteria methods that can be applied to the same file. For example, a rule collection can evaluate input files to assign chapter starts based on a specific style sheet, assign inserts based on color space and assign tabs based on whether a specific font style can be utilized in a given page. The exception programmer 230 is preferably implemented with one or more data objects or other programs stored in memory, either primary or secondary, of a document processor 250.

Figure 3:
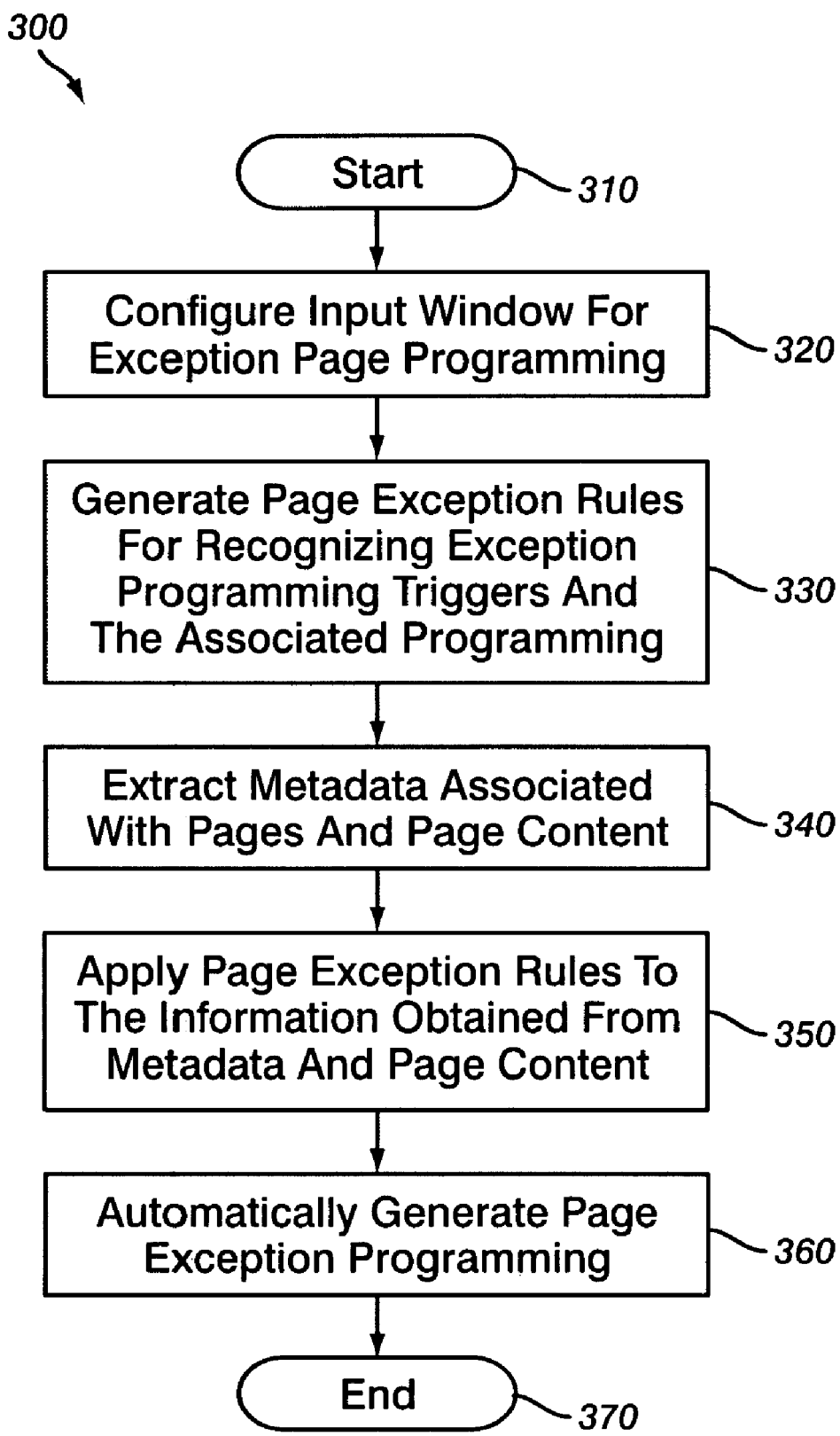
FIG. 3 illustrates a high level flow chart of operations illustrating logical operational steps of a method for page exception programming utilizing metadata, in accordance with a preferred embodiment.

Referring to FIG. 3 a high level flow chart of operations illustrating logical operational steps of a method 300 for the page exception programming utilizing metadata, in accordance with a preferred embodiment. Note that the method 300 depicted in FIG. 3 can be implemented in the context of a software module such as, for example, the module 111 of apparatus 100 depicted in FIG. 1. The process depicted in FIG. 3 can be initiated, as indicated at block 310. Thereafter, as depicted at block 320, an input window for exception page programming can be configured. As described next at block 330, the page exception rules can be generated for recognizing exception programming triggers and the associated programming.

Metadata associated with the pages and the page content can be extracted, as depicted at block 340. Metadata is data about data. For example, the title, subject, author, and size of a file constitute metadata about a file. With respect to graphics, the current position, color, and size of a primitive, such as a box, constitute metadata for the box. With respect to a primitive, in computer graphics, a shape, such as a line, circle, curve, or polygon, that can be drawn, stored, and manipulated as a discrete entity by a graphics program. A primitive is one of the elements from which a large graphic design is created. The page exception rules can be applied to the information obtained from the metadata and the page content, as indicated at block 350. The page exception programming can be automatically generated based on the page exception rules, as illustrated at block 360. The process can then terminate, as indicated at block 370.

Figure 4:
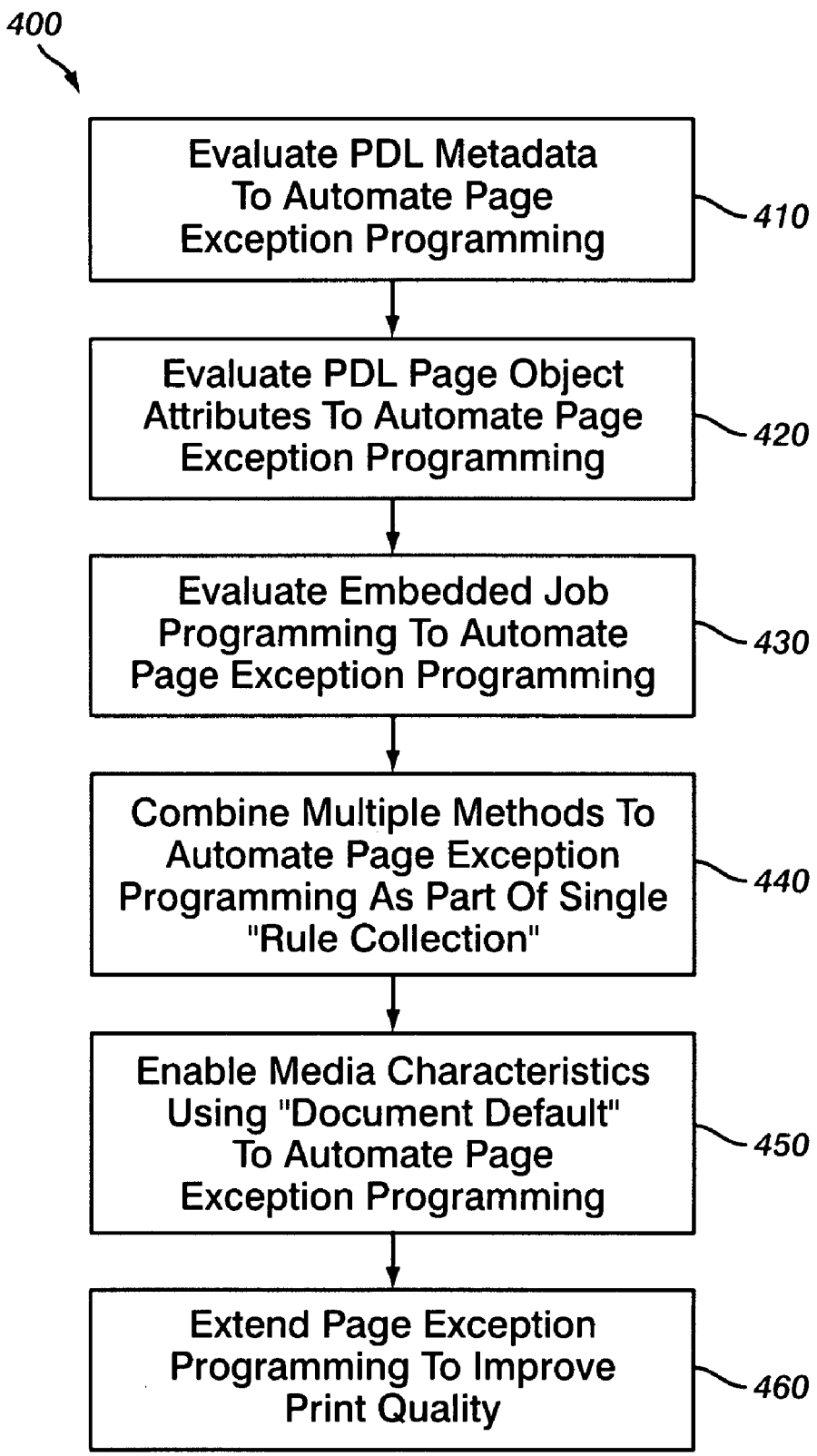
FIG. 4 illustrates a high level flow chart of operations illustrating logical operational steps of a method for page exception programming rules, in accordance with a preferred embodiment.

Referring to FIG. 4, a high level flow chart of operations illustrating logical operational steps of a method 400 for implementing page exception programming rules is illustrated, in accordance with a preferred embodiment. As indicated at block 410, PDL metadata can be evaluated to automate page exception programming. The metadata can be data, such as, for example, PDF bookmarks, page dimensions, color spaces, document structure information such as style sheets, etc. The metadata values can be utilized to define the page exception programming selection. For example, the name of a specific PDF Bookmark (e.g. Insert) can be utilized to search and select the proper page exception programming. A user is able to store a set of page exception programming selections under a specific name that can be used for comparison. A specific page property can also be used to define page exception programming e.g. color pages printed to a monochrome printers can be automatically programmed as insert sheets or pages of a given dimension such as 9×11 on an 8.5×11 document can be associated with specific page exception programming.

Next, as shown at block 420, PDL page object attributes can be evaluated. The page attributes can be keywords or patterns that can be used to search for. For example, changes to the chapter name in a header or footer or changes to the page number prefix in hyphenated page numbering styles. Thereafter, embedded job programming can also be evaluated, as depicted at block 430. Multiple methods can be combined to automate page exception programming as a part of "single rule" collection, as illustrated at block 440. Thereafter, as depicted at block 450, media characteristics can be enabled utilizing "document default". For example, the media selected for page exception programming can be defined as having a media color of "Blue" with all other choices set to "document default". This rule can be used with a queue so that any pages with a PDF Bookmark with name "Blue" can be printed on media that matched the media selected for the job in every aspect except for the media color. This allows a single page exception rule to be used on jobs with a variety of selected media sizes and weights.

The metadata can also be used to control specific page exception selections. For example, the name of a PDF Bookmark (e.g. 5 Blue Insert) can be evaluated in order to determine the page exception programming that can be used. The system can then go to the inserts rule for the specific job. Within the rule, certain media exception parameters can be defined as further evaluations against the PDF bookmark so that if the name of a valid Media Color is found the page defined by the exception programming is printed on that media. Similarly, another media programming rule can look for numbers in the string and use them to define the number of times the associated page can be printed within the collated document. The media parameters can be set to "document default" values if the rules did not find the required data. The page exception programming can also be extended to include print quantity which can cover any and all page exception functionality, as shown at block 460.

The page exception rules can be associated with a specific input method. The system can receive jobs inspect and evaluate the received jobs against the user defined page exception rules and generate page exception programming that can be used by the associated RIP (Raster Image Processor) and print engine. The auto generated page exception programming created can be combined with any embedded PDL device control instructions, e.g. PostScript SetPageDevice instructions and the HP PCL equivalents. The integrated list of exception page programming can be useful when reviewing the job programming or any displays that include job programming effects.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
   extracting metadata associated with at least one page and content of the at least one page of a print data language (PDL) file on a per page basis using a data processing apparatus;
   pre-configuring a plurality of page exception rules based on the metadata;
   automatically configuring page exception programming on a per page basis in response to evaluating said plurality of metadata against said plurality of page exception rules;
   automatically creating said page exception programming by evaluating a plurality of embedded device control instructions, thereby producing an integrated representation of said plurality of pages with respect to a particular print job; and
   displaying said at least one page from the plurality of pages extracted as an exception page on a graphical user interface (GUI) to provide an ability to edit the page to thereby assist a user in manually implementing page exception programming.

2. The method of claim 1 further comprising associating said plurality of page exception rules with a plurality of page exception programming parameters utilizing an exception programmer.

3. The method of claim 1 wherein at least one exception rule among said plurality of page exception rules enables at least one media characteristic thereof utilizing a document default setting.

4. The method of claim 1 further comprising combining said page exception programming with at least one embedded PDL device control instruction.

5. The method of claim 1 further comprising:
   associating a group of page exception rules with a specific input mechanism; and
   applying at least one evaluation methods to said group to automatically create at least some of said page exception programming.

6. The method of claim 5 wherein said specific input mechanism comprises a rendering device.

7. The method of claim 5 wherein said specific input mechanism comprises a queue and/or a hot folder.

8. A method, comprising:
   extracting metadata associated with at least one page and page content of a PDL file on a per page basis using a data processing apparatus;
   pre-configuring a plurality of page exception rules based on the metadata;
   automatically creating page exception programming on a per page basis in response to evaluating said metadata and said plurality of page exception rules to allow a user to manually control said page exception programming;
   automatically creating said page exception programming in response to evaluating a plurality of embedded device control instructions, thereby producing an integrated representation of said plurality of pages with respect to a particular print job; and
   displaying said at least one page extracted as an exception page utilizing a graphic user interface (GUI), to provide the user with an interface to view said at least one page.

9. The method of claim 8 further comprising associating said plurality of page exception rules with one or more page exception programming parameters.

10. The method of claim 8 wherein at least one exception rule among said plurality of one or more page exception rules invokes at least one media characteristic thereof a document default setting.

11. The method of claim 8 further comprising combining said page exception programming with at least one embedded PDL device control instruction.

12. The method of claim 8 wherein said page exception programming comprises an alternate processing technique applied to a subset of pages in said PDL file.

13. The method of claim 12 further comprising achieving said alternate processing technique applied to said subset of pages in said PDL file by modifying a particular job programming task to affect a rendered output.

14. The method of claim 12 further comprising achieving said alternate processing technique applied to said subset of pages in said PDL file by implementing changes to said PDL file that affect a rendered output.

15. A computer implemented system comprising:
   a data-processing apparatus;
   a module executable by said data-processing apparatus, said module and said data-processing apparatus being operable in combination with one another to:
   extract a plurality of metadata associated with at least one page and content of the at least one page of a PDL file on a per page basis;
   pre-configure a plurality of page exception rules;
   automatically create page exception programming on a per page basis by evaluating said plurality of metadata against said plurality of page exception rules;
   automatically create said page exception programming based on a plurality of embedded device control instructions, to produce an integrated representation of said plurality of pages with respect to a particular job; and
   display said at least one page identified as an exception page on a graphical user interface (GUI), thereby providing an operator with an ability to view said at least one page utilizing said GUI to thereby assist a user in manually controlling said page exception programming.

16. The system of claim 15 wherein said data-processing apparatus and said module are further operable in combination with one another to associate said plurality of page exception rules with one or more page exception programming parameters.

17. The system of claim 15 wherein at least one exception rule among said plurality of page exception rules enables usage of at least one media characteristic thereof utilizing a document default setting.

18. The system of claim 15 wherein said data-processing apparatus and said module are further operable in combination with one another to combine said page exception programming with at least one embedded PDL device control instruction.

19. The system of claim 15 wherein said data-processing apparatus and said module are further operable in combination with one another to:
   save said page exception rules as a collection associated with a specific input mechanism; and
   apply a plurality of evaluation methods to said collection associated with said specific input mechanism in order to automatically create said page exception programming.

* * * * *